Jan. 29, 1952 C. E. LOMAX 2,583,782

PARTY LINE CONNECTOR CIRCUIT FOR CODE RINGING

Filed Jan. 21, 1948 3 Sheets-Sheet 1

INVENTOR.
Clarence E. Lomax
BY
Smith, Olsen & Baird
Attys.

INVENTOR.
Clarence E. Lomax
BY
Smith, Olsen & Baird
Attys.

INVENTOR.
Clarence E. Lomax
BY
Smith, Olsen & Baird
Attys.

Patented Jan. 29, 1952

2,583,782

UNITED STATES PATENT OFFICE 2,583,782

PARTY LINE CONNECTOR CIRCUIT FOR CODE RINGING

Clarence E. Lomax, Chicago, Ill., assignor to Automatic Electric Laboratories, Inc., Chicago, Ill., a corporation of Delaware Application January 21, 1948, Serial No. 3,424

9 Claims. (Cl. 179—17)

The present invention relates to automatic telephone systems, and more particularly to connector switches for such systems.

It is an object of the present invention to provide in an automatic telephone system, including both a group of trunks and a plurality of party subscriber lines, a connector switch incorporating combination trunk-hunting and ringing control facility.

Another object of the invention is to provide an automatic switch incorporating improved divided ringing control facility.

A further object of the invention is to provide in an automatic switch having access to a party subscriber line via two paths, an improved arrangement responsive to the path over which the party subscriber line is selected by the switch for selectively determining the divided ringing circuit to be utilized in projecting ringing current over the selected party subscriber line.

Further features of the invention pertain to the particular arrangement of the circuit elements of the connector switch; whereby the above-outlined and additional operating features thereof are attained.

Figure 1:
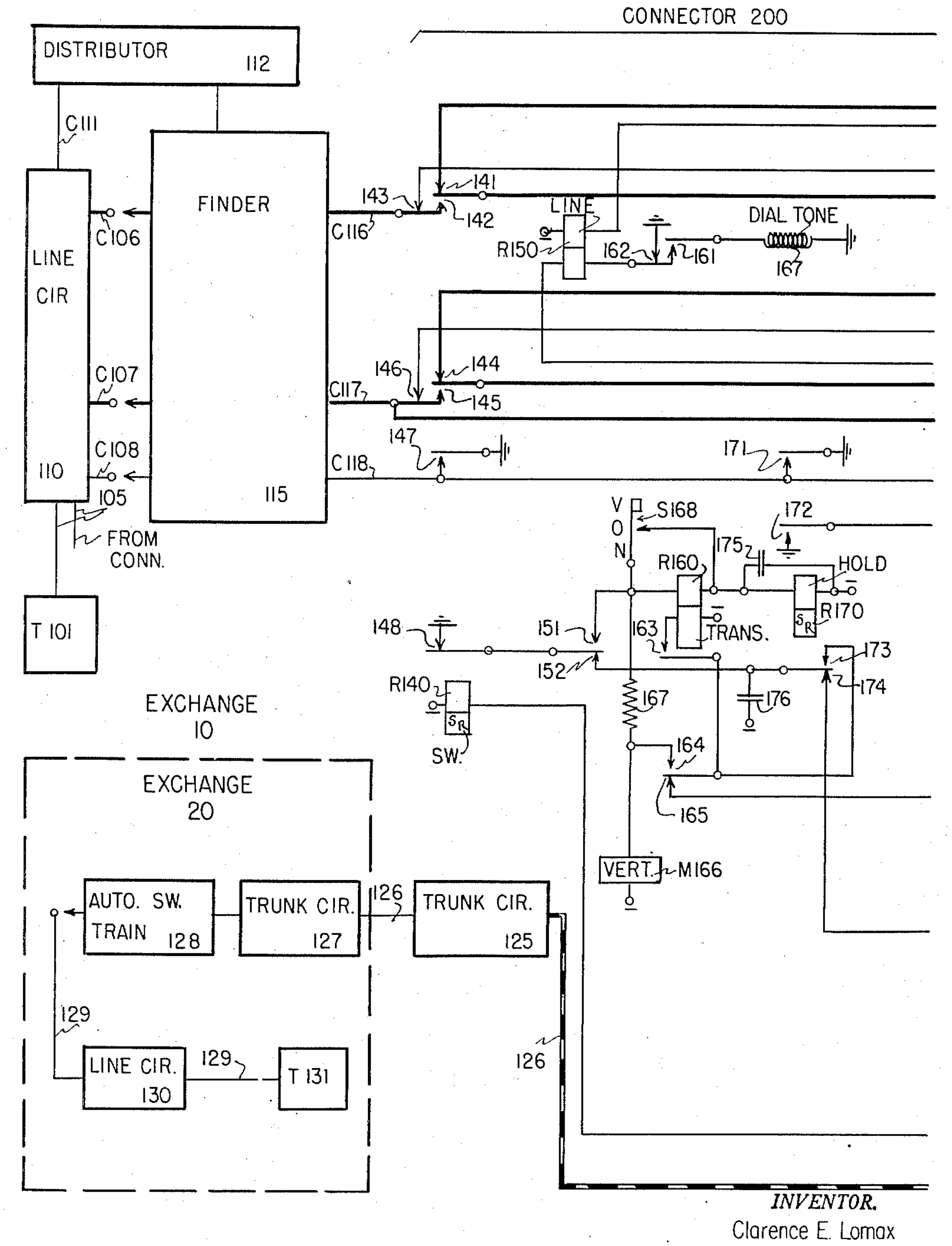
Figure 2:
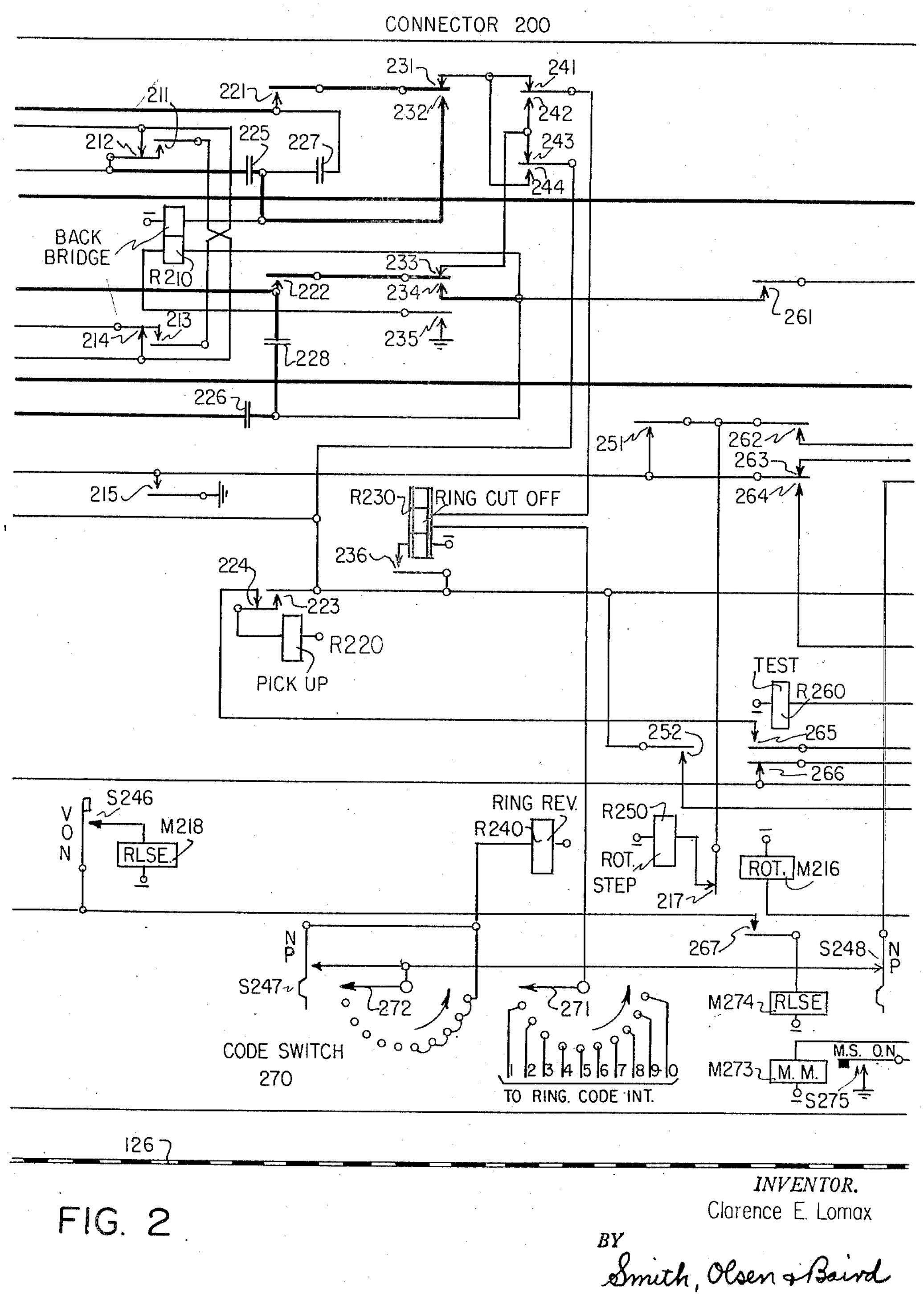
Figure 3:
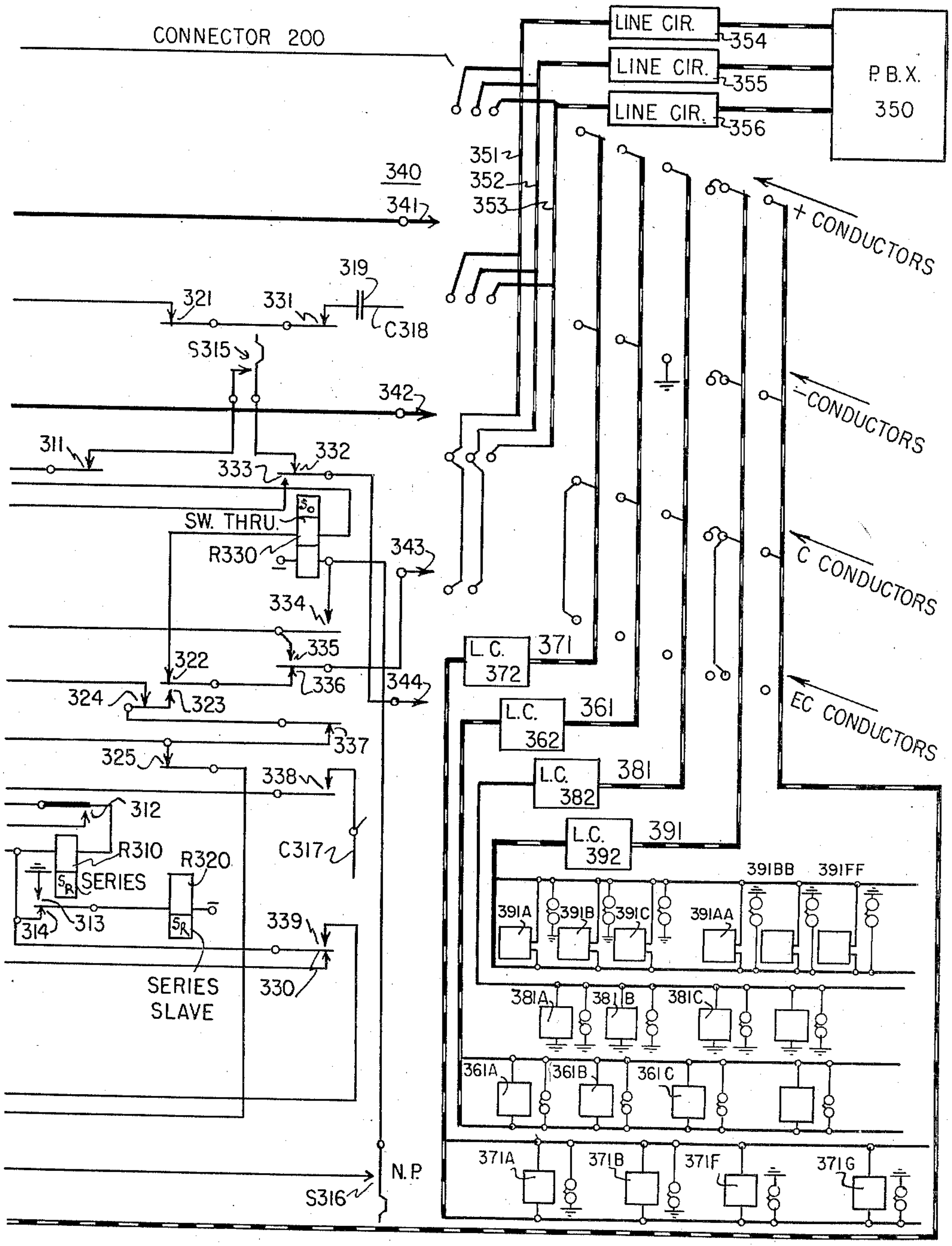

The invention, both as to its organization and method of operation, together with further objects and advantages thereof, will best be understood by reference to the folowing specification taken in connection with the accompanying drawings, in which Figures 1 to 3, inclusive, taken together illustrate the details of an automatic telephone system having incorporated therein the features of the present invention. Specifically Figs. 1 to 3, inclusive, should be arranged in upstanding side-by-side relation from left to right in order to form a unified diagram.

Referring now more particularly to Figs. 1 to 3, inclusive, of the drawings, there is illustrated an automatic telephone system comprising two exchanges 10 and 20 interconnected by a group of trunk lines, including the trunk line 126, respectively terminating in trunk circuits disposed in the exchanges 10 and 20; the trunk line 126 terminating in the trunk circuits 125 and 127 respectively disposed in the exchanges 10 and 20.

The exchange 10 serves a group of private subscriber lines, including the private subscriber line 105; the private subscriber substation T101 being connected to the private subscriber line 105. Also the exchange 10 serves a number of groups of private branch exchange trunks, one of the groups including the three private branch exchange trunks 351, 352 and 353 to which the private branch exchange 350 is connected. Also the exchange 10 serves a first group of party subscriber lines, including the party subscriber line 361 to which ten party subscriber substations 361A, 361B, etc., are connected; the party subscriber line 361 being arranged for bridged ringing. Further the exchange 10 serves a second group of party subscriber lines, including the party subscriber line 371 to which ten party subscriber substations 371A, 371B, etc., are connected; the party subscriber line 371 being arranged for drivided ringing. Further the exchange 10 serves a third group of party subscriber lines, including the party subscriber line 381 to which ten party subscriber substations 381A, 381B, etc., are connected; the party subscriber line 381 being of the ground return type. Further the exchange 10 serves a fourth group of party subscriber lines, including the party subscriber line 391 to which twenty party subscriber substations 391A, 391B, etc., and 391AA, 391BB, etc., are connected; the party subscriber line 391 being arranged for divided ringing. Finally, the exchange 10 serves the group of trunk lines, including the trunk line 126 extending between the exchanges 10 and 20.

Further in the exchange 10, the private subscriber lines 105, etc., are provided with individually associated line circuits 110, etc.; the party subscriber lines 361, 371, 381, 391, etc., are provided with individually associated line circuits 362, 372, 382, 392, etc.; and the private branch exchange trunks 351, 352, 353, etc., are provided with individually associated line circuits 354, 355, 356, etc. Also the exchange 10 comprises a plurality of finder-connector links, one of which is illustrated as comprising the finder 115 and the connector 200, and an associated distributor 112 operatively connected between the various links and the various line circuits 110, etc. In the exchange 10 each private subscriber substation T101, etc., and each party subscriber substation 361A, 381A, 391A, etc., are provided with conventional substation apparatus including a transmitter, a receiver, a dial and a ringer. Also, the P. B. X 350 is provided with conventional apparatus including an attendant's cabinet. Finally, the line circuits 110, 362, 372, 382, 392, 354, 355, 356, etc., as well as the distributor 112, are of any suitable types. Moreover the trunk circuits 125, etc., and 127, etc., in the respective exchanges 10 and 20 are of any suitable type.

Preferably, the finders 115, etc., are of the conventional Strowger type and have access to the various private subscriber lines 105, etc., to the various party subscriber lines 361, 371, 381, 391, etc., and to the private branch exchange trunks 351, 352, 353, etc. Similarly, the connectors 200, etc., have access to the private subscriber lines 105, etc., to the party subscriber lines 361, 371, 381, 391, etc., to the private branch exchange trunks 351, 352, 353, etc., and to the trunk lines 126, etc.

The exchange 20 is of the automatic type and serves a number of subscriber lines, including the private subscriber line 129 to which the private subscriber substation T131 is connected. The private subscriber lines 129, etc., are provided with individually associated line circuits 130, etc. Further the automatic exchange 20 comprises an automatic switch train 128 of any suitable type associated with the trunk circuits 127, etc., and having access to the private subscriber lines 129, etc.

In the exchange 10 each of the connectors is identical to the connector 200, which comprises, as shown in Figs. 1 to 3, inclusive, a relay group, including a switch relay R140, a line relay R150, a transfer relay R160, a hold relay R170, a back-bridge relay R210, a pick-up relay R220, a ring cut-off relay R230, a ring reverse relay R240, a rotary step relay R250, a test relay R260, a series relay R310, a series slave relay R320, and a switch-through relay R330. Also the connector 200 comprises a Strowger mechanism 340, including four individual wipers 341, 342, 343 and 344, a vertical magnet M166 for driving the wiper carriage step by step in the vertical direction away from its normal vertical position, a rotary magnet M216 for driving the wiper carriage step by step in the rotary direction away from its normal rotary position, and a release magnet M218 for releasing the wiper carriage and for causing it to be returned to its normal rotary and vertical positions. Also associated with the wiper carriage are a number of sets of switch springs S168, S246, S247, S248, S315 and S316, which are operated in response to various operations of the wiper carriage of the Strowger mechanism 340. Specifically, the sets of switch springs S168 and S246 are operated when the wiper carriage of the Strowger mechanism 340 is driven one step in the vertical direction away from its normal vertical position; the sets of switch springs S315 and S316 are operated when the wiper carriage of the Strowger mechanism 340 is driven in the vertical direction to the tenth level in the associated contact bank in which the trunk lines 126, etc., are terminated; the switch springs S248 and S315 are operated when the wiper carriage of the Strowger mechanism 340 is driven in the vertical direction to the ninth level in the associated contact bank in which the private branch exchange trunks 351, 352 and 353 are terminated; and the set of switch springs S247 is operated when the wiper carriage of the Strowger mechanism 340 is driven in the vertical direction to the level in the associated contact bank in which the fourth group of party subscriber lines 391, etc., are terminated. Also in the contact banks of the connectors 200, etc., the extra control conductor of the first two private branch exchange trunks 351 and 352 are respectively connected to the control conductors thereof; and likewise, the extra control conductor of the party subscriber line 371 is connected to the control conductor thereof. Finally, in the contact banks of the connectors 200, etc., the party subscriber line 391 terminates on two adjacent rotary contact sets and in the second of the two contact sets the extra control conductor is connected to the control conductor; and of course, the line conductors and the control conductors of the two contact sets are respectively multipled together. Finally in the contact banks of the connectors 200, etc., the positive line conductor of the contact set terminating the party subscriber line 381 is connected directly to ground potential since the party subscriber line 381 is of the ground return type as previously noted.

Finally, the connector 200 comprises a code switch 270 of the minor type including two individual wipers 271 and 272, a rotary magnet M273 for driving the wipers noted step by step in the counterclockwise direction away from their normal rotary positions; and a release magnet M274 for releasing the wipers noted and for returning them to their normal rotary positions. Further a set of switch springs S275 is associated with the wipers noted and is operated when the wipers are driven one step in the counterclockwise direction away from their normal rotary positions.

Finally the exchange 10 comprises a conventional ringing code interrupter, not shown, having ten individual ringing code conductors and a pick-up conductor C317 extending therefrom to each of the links, including that illustrated. The ten individual ringing code conductors are terminated upon the respective ten contacts in the contact bank associated with the wiper 271 in the code switch 270 incorporated in the connector 200; and the pick-up conductor C317 extends to the contacts 338 of the switch-through relay R330 in the connector 200. The ringing code interrupter, not shown, may be either of the harmonic frequency or of the coded splash types; whereby the ringing currents applied to the ten individual ringing code conductors may be either of corresponding harmonic frequencies or of corresponding series of coded splashes of short and long durations. In either case battery potential in the ringing code interrupted is applied to each individual code conductor so that the upper winding of the ring cutoff relay in any connector may be energized thereover in response to an answer upon a called line selected thereby; all in a conventional manner.

A better understanding of the connection and arrangement of the apparatus incorporated in the telephone system will be facilitated from a consideration of the extension of various calls in the exchange 10.

First assuming that a call is initiated at the private subscriber substation T101 in the exchange 10 and is to be extended to a private subscriber substation, such for example, as the private subscriber substation T131 in the exchange 20, when the call is initiated at the calling subscriber substation T101, the line circuit 110 is controlled over the associated private subscriber line 105; whereby ground potential in the line circuit 110 is applied to the start conductor C111 extending to the distributor 112. The distributor operates in response to the application of ground potential to the start conductor C111 and assigns an idle one of the links, such for example, as that illustrated for use at this time. More particularly, operation of the finder 115 of the link illustrated is initiated; whereby the finder 115 operates in order to find the calling private subscriber line 105, the private subscriber line 105 being marked as a calling line by the application of battery potential in the line circuit 110 to the control conductor C108 thereof. When the finder 115 finds the calling private subscriber line 105 further operation thereof is arrested and the calling private subscriber line 105 is seized, ground potential in the finder 115 being applied to the control conductor C108 of the private subscriber line 105; whereby the line circuit 110 operates to mark the private subscriber line 105 as busy to the connectors 200, etc., having access thereto. Also at this time the distributor 112 is dismissed and the finder 115 is marked as busy thereto. Moreover, a loop circuit is completed between the calling private subscriber substation T101 and the line relay R150 in the connector 200. This loop circuit extends from ground potential by way of the contacts 162, the lower winding of the line relay R150, the contacts 214 and 146 to the line conductor C117; and from battery potential by way of the upper winding of the line relay R150 and the contacts 212 and 143 to the line conductor C116; the line conductors C117 and C116 are connected via the finder 115 to the line conductors C107 and C106 of the private subscriber line 105 and thence to the calling private subscriber substation T101. When this loop circuit is thus completed, the line relay R150 operates to complete, at the contacts 151, a circuit, including the contacts 148, for energizing in series the upper winding of the transfer relay R160 and the winding of the hold relay R170; whereby the relays mentioned operate. Also upon operating the line relay R150 completes, at the contacts 151, a multiple priming circuit, including the contacts 148 and the resistor 167, for energizing the vertical magnet M166 of the Strowger mechanism 340, thereby rendering the vertical magnet M166 slightly fast-to-operate when a direct circuit traced hereinafter is completed for energizing it.

Upon operating the transfer relay R160 completes, at the contacts 161, a path for connecting ground potential by way of the winding 167 of the dial tone transformer in the loop circuit extending back to the calling private subscriber substation T101; and interrupts, at the contacts 162, the original path for connecting ground potential in the loop circuit mentioned. Accordingly, at this time dial tone current is returned over the loop circuit to the calling private subscriber substation T101 indicating to the subscriber thereat that the directory number of the called private subscriber substation T131 in the exchange 20 may be dialed. Also upon operating the transfer relay R160 prepares, at the contacts 164, a direct circuit traced hereinafter for operating the vertical magnet M166 of the Strowger mechanism 340. Upon operating the hold relay R170 completes, at the contacts 171 a path for applying ground potential in the connector 200 to the control conductor C118 in order to retain operated the finder 115. Also the hold relay R170 prepares, at the contacts 173, a further point in the previously mentioned direct circuit for operating the vertical magnet M166 of the Strowger mechanism 340.

The directory number of the called private subscriber substantially T131 in the exchange 20 comprises the prefix digits 0 and 1 followed by a number of individual digits, and may, for example, be 01–123. Accordingly, the subscriber at the calling private subscriber substation T101 proceeds to dial the first prefix digit 0; whereby the line relay R150 follows. Each time the line relay R150 restores and then reoperates, it completes and then interrupts, at the contacts 151, the previously traced circuit for energizing the winding of the hold relay R170; whereby the latter relay is retained in its operated position during impulsing as it is of the slow-to-release type. Moreover, the hold relay R170 is rendered additionally slow-to-release by virtue of the connection of the condenser 175 in shunt to the winding thereof; whereby the condenser 175 is normally charged in multiple with the winding of the hold relay R170 and is discharged through the winding of the hold relay R170 when the normal circuit for energizing the winding of the hold relay R170 is interrupted. Also each time the line relay R150 restores and then reoperates, it completes, and then interrupts, at the contacts 152, a circuit, including the contacts 148, 173 and 163,, for energizing the lower winding of the transfer relay R160; whereby the latter relay is retained in its operated position during impulsing as it is of the slow-to-release type. Also each time the line relay R150 restores and then reoperates, it completes and then interrupts, at the contacts 152, a multiple circuit, including the contacts 148, for charging the condenser 176; whereby the transfer relay R160 is rendered additionally slow-to-release. More particularly, the condenser 176 is charged in multiple with the lower winding of the transfer relay R160 when the circuit mentioned is closed and is discharged through the lower winding of the transfer relay R160 when the circuit mentioned is opened. Finally, each time the line relay R150 restores and then reoperates, it completes and then interrupts, at the contacts 152, a multiple direct circuit, including the contacts 148, 173 and 164, for operating the vertical magnet M166; whereby the wiper carriage of the Strowger mechanism 340 is driven step by step in the vertical direction away from its normal vertical position. When the wiper carriage of the Strowger mechanism 340 is driven one step in the vertical direction away from its normal vertical position, the sets of switch springs S168 and S246 are operated. More particularly, the set of switch springs S168 is closed in order to short-circuit the upper winding of the transfer relay R160; and to complete a direct circuit, including the contacts 151 and 148, for energizing the winding of the hold relay R170. Also the set of switch springs S246 is closed in order to prepare a circuit traced hereinafter for operating the release magnet M218 of the Strowger mechanism 340.

At the conclusion of the first prefix digit 0, the line relay R150 is retained in its operated position and the wiper carriage of the Strowger mechanism 340 occupies its tenth vertical level; whereby the wiper 341, 342, 343 and 344 stand opposite the tenth level in the associated contact bank in which the trunk lines 126, etc., are terminated. When the wiper carriage of the Strowger mechanism 340 is thus driven ten steps in the vertical direction away from its normal vertical position, the set of switch springs S316 is operated in order to prepare a circuit traced hereinafter for energizing the winding of the switch relay R140 in multiple with the lower winding of the test relay R330; and the set of switch springs S315 is operated in order to prepare a circuit traced hereinafter for energizing the winding of the rotary step relay R250. Also shortly following the first prefix digit 0, the transfer relay R160 restores, it being of the slow-to-release type, in order to interrupt, at the contacts 161, the previously traced path for connecting ground potential by way of the winding 167 of the dial tone transformer in the loop circuit mentioned; and to recomplete, at the contacts 162, the original path for connecting ground potential in the loop circuit mentioned. Accordingly, the return of dial tone current over the loop circuit to the calling private subscriber substation T101 is arrested at this time. Also upon restoring, the transfer relay R160 interrupts, at the contacts 163, a further point in the circuit for energizing the lower winding thereof; interrupts, at the contacts 164, a further point in the direct circuit for operating the vertical magnet M166 of the Strowger mechanism 340; and prepares, at the contacts 165, a circuit traced hereinafter for energizing the winding of the series relay R310 in series with the rotary magnet M216 of the Strowger mechanism 340.

The subscriber at the calling private subscriber substation T101 then proceeds to dial the second prefix digit 1; whereby the line relay R150 again follow. More particularly, the line relay R150 restores and then reoperates, interrupting, and then recompleting, at the contacts 151, the circuit, including the contacts 148 and the set of switch springs S168, for energizing the winding of the hold relay R170; whereby the latter relay is retained in its operated position during impulsing, it being of the slow-to-release type. Also the line relay R150 completes and then interrupts, at the contacts 152, a circuit, including the contacts 148, 173, 165, 266 and 330, for energizing the winding of the series relay R310 in series with the rotary magnet M216; of the Strowger mechanism 340 as well as a multiple path, also including the contacts 314, for energizing the winding of the series relay R310 in series with the winding of the series slave relay R320; whereby the series relay R310, the series slave relay R320 and the rotary magnet M216 operate. Upon operating the series relay R310 completes, at the contacts 312, a point in multiple to the contacts 266 for energizing the winding thereof in series with the rotary magnet M216; interrupts, at the contacts 314, the original circuit for energizing the winding of the series relay R310 in series with the winding of the series slave relay R320; and completes, at the contacts 313, a direct circuit for retaining operated the series slave relay R320. Accordingly, the rotary magnet M216 operates and then restores in order to drive the wiper carriage of the Strowger mechanism 340 one step in the rotary direction away from its normal rotary position; whereby the wipers 341, 342, 343, and 344 engage the contact set in the associated contact bank terminating the first trunk line in the group, including the trunk line 126 extending between the exchanges 10 and 20.

Shortly following the second prefix digit 1, the series relay R310 restores as it is of the slow-to-release type to interrupt, at the contacts 313, the circuit for retaining operated the series slave relay R320; whereby the series slave relay R320, being of the slow-to-release type, is retained operated a short-time interval following the restoration of the series relay R310. At this time the idle or busy condition of the first trunk line in the group, including the trunk line 126 is tested; ground potential or battery potential being present upon the control conductor of the first trunk line mentioned in the event the first trunk line is respectively busy or idle. Also the extra control or EC conductor of the first trunk line mentioned is strapped to the control or C conductor thereof; whereby one of the potentials mentioned is also applied to the extra control or EC conductor thereof. First assuming that the first trunk line mentioned is busy, ground potential appearing upon the control conductor thereof completes a circuit, including the control wiper 343, the contacts 336, 323 and 337, for operating the test relay R260. Upon operating the test relay R260 completes, at the contacts 262, a circuit, including the contacts 217 and 311, the set of switch springs S315, the contacts 332, the extra control wiper 344, and the extra control conductor of the first trunk mentioned, having ground potentials thereon, for operating the rotary step relay R250. Upon operating the rotary step relay R250 completes, at the contacts 251, a holding circuit, including the contacts 171 and 217, for energizing the winding thereof; completes, at the contacts 252, an alternative circuit, including the contacts 172 and 314, for energizing the winding of the series slave relay R320; and completes, at the contacts 252, a multiple circuit, including the contacts 172 and 330, for operating the rotary magnet M216. Accordingly, since the first trunk line in the group, including the trunk line 126 is busy, the series slave relay R320 is retained in its operated position and the rotary magnet M216 is reoperated. Accordingly, the rotary magnet M216 reoperates to drive the wiper carriage of the Strowger mechanism 340 an additional step in the rotary direction; whereby the wipers 341, 342, 343 and 344 disengage the contact set in the associated contact bank terminating the first trunk line in the group mentioned and engage the contact set in the associated contact bank terminating the second trunk line in the group mentioned; whereby the idle or busy condition of the second trunk line mentioned is tested.

More particularly, upon operating the rotary magnet M216 also interrupts, at the contacts 217, the holding circuit for retaining operated the rotary step relay R250; whereby the latter relay restores interrupting, at the contacts 252, the alternative holding circuit for energizing the winding of the series slave relay R320 and the multiple circuit for operating the rotary magnet M216. Upon restoring, the rotary magnet M216 reprepares, at the contacts 217, the circuit for operating the rotary step relay R250. At this time battery potential is connected via the winding of the test relay R260 and the previously traced path to the control wiper 343; whereby the idle or busy condition of the second trunk line in the group mentioned is tested; the test relay R260 reoperating in the event the second trunk line in the group mentioned is busy in the manner previously explained. Accordingly, the connector 200 operates at this time in order to select an idle trunk line in the previously selected group mentioned.

Assuming now that all of the trunk lines in the group mentioned, preceding the last trunk line 126 therein, are busy at this time, the rotary magnet M216 is operated a corresponding number of times in order to drive the wiper carriage of the Strowger mechanism 340 a corresponding number of steps in the rotary direction until the wipers 341, 342, 343 and 344 engage the contact set in the associated contact bank terminating the last trunk line 126 in the group mentioned. At this time the idle or busy condition of the last trunk line 126 in the group mentioned is tested. First assuming that the last trunk line 126 is also busy, ground potential appears upon the control conductor thereof, but no potential appears upon the extra control conductor thereof since the extra control conductor of the trunk line 126 is not strapped to the control conductor thereof. Accordingly, at this time the previously traced circuit for operating the test relay R260 is completed; however, operation of the test relay R260 is without effect since no potential appears upon the extra control wiper 344 as noted above. Hence, shortly following operation of the test relay R260, the series slave relay R320 restores as it is of the slow-to-release type. Upon restoring, the series slave relay R320 completes, at the contacts 324, an alternative holding circuit, including the contacts 337, 264 and 171, for retaining operated the test relay R260. Further the series slave relay R320 completes, at the contacts 321, a connection, including the contacts 261 and 331 and the condensers 319 and 226, between the busy conductor C318 and the line conductor C117; whereby busy tone current is returned over the connection to the calling private subscriber substation T101 indicating to the subscriber thereat that the desired connection may not be completed at this time due to the busy condition mentioned. Accordingly, the subscriber at the calling private subscriber substation T101 disconnects in order to effect the release of the link illustrated in a manner substantially identical to that described hereinafter.

Now assuming that the last trunk line 126 in the group mentioned is idle when it is selected by the wipers 341, 342, 343 and 344 of the Strowger mechanism 340, battery potential appearing upon the control conductor thereof completes a path substantially identical to that previously traced for short-circuiting the winding of the test relay R260; whereby the latter relay is not operated at this time. Accordingly, shortly thereafter, when the series slave relay R320 restores, it interrupts, at the contacts 323, the path for short-circuiting the winding of the test relay R260; and completes, at the contacts 322, a circuit, including the contacts 336, 263 and 171 and the control wiper 343, for energizing the upper winding of the switch-through relay R330; whereby the latter relay operates shortly thereafter, it being of the slow-to-operate type. Upon operating the switch-through relay R330 completes, at the contacts 334, a holding circuit, including the contacts 172, for energizing the lower winding thereof; and completes, at the contacts 335, a direct path, including the contacts 172, for applying ground potential to the control wiper 343. Also the switch-through relay R330 completes, at the contacts 334, a multiple circuit, including the contacts 172 and the set of switch springs S316, for operating the switch relay R140. Upon operating the switch relay R140 completes, at the contacts 142 and 145, a direct connection between the line conductors C116 and C117 and the line wipers 341 and 342 and consequently a direct loop circuit between the calling private subscriber substation T101 and the line relay, not shown, in the trunk circuit 125 terminating the trunk line 126. The loop circuit extending from the private subscriber substation T101 to the trunk circuit 125 includes the private subscriber line 105, the line circuit 110 and the finder 115, the connector 200 and the trunk line 126. When this loop circuit is completed, the trunk circuit 125 operates to return ground potential over the control conductor of the trunk line 126 thereby to complete an alternative holding circuit, including the control wiper 343 and the contacts 335 and 334, for energizing the lower winding of the switch-through relay R330 and a multiple holding circuit, also including the set of switch springs S316, for energizing the winding of the switch relay R140.

Also upon operating the switch relay R140 interrupts, at the contacts 143 and 146, the original loop circuit extending to the upper and lower windings of the line relay R150 in order to cause the latter relay to restore. Further the switch relay R140 completes, at the contacts 147, a multiple path for applying ground potential to the control conductor C118; and interrupts, at the contacts 148, the circuit for energizing the winding of the hold relay R170 in order to cause the latter relay to restore shortly thereafter, it being of the slow-to-release type. Accordingly, at this time, the connector 200 is switched through and only the switch relay R140 and the switch-through relay R330 therein occupy their operated positions. Moreover, when the trunk circuit 125 is thus seized, the trunk circuit 127 in the exchange 20 is governed over the associated trunk line 126; whereby the automatic switch train 128 in the exchange 20 is operatively associated with the trunk circuit 127.

At this time the subscriber at the calling private subscriber substation T101 proceeds to dial the three digits 1, 2 and 3; whereby the digits mentioned are transmitted over the loop circuit to the trunk circuit 125; whereupon the trunk circuit 125 repeats the three digits mentioned over the trunk line 126 to the trunk circuit 127; and the trunk circuit 127 repeats the three digits mentioned to the automatic switch train 128. The automatic switch train 128 responds to the three digits 1, 2 and 3 to select the private subscriber line 129 extending to the called private subscriber substation T131 in the exchange 20; whereupon the idle or busy condition thereof, as marked by the associated line circuit 130, is tested in the automatic switch train 128. Assuming that the called private subscriber substation T131 is idle at this time, the automatic switch train 128 operates to project ringing current thereto over the associated private subscriber line 129; and when the call is answered at the called private subscriber substation T131, the automatic switch train 128 switches through, thereby completing an established connection between the calling private subscriber substation T101 in the exchange 10 and the called private subscriber substation T131 in the exchange 20.

At the conclusion of this established connection when the subscriber at the calling private subscriber substation T101 in the exchange 10 disconnects, the loop circuit extending therefrom to the trunk circuit 125 is interrupted; whereby the trunk circuit 125 operates in order to remove the application of ground potential from the control conductor of the trunk line 126, thereby to interrupt the holding circuits for energizing the lower winding of the switch-through relay R330 and the winding of the switch relay R140 causing the relays mentioned to restore. Upon restoring the switch relay R140 interrupts, at the contacts 147, the path for applying ground potential to the control conductor C118, thereby to effect the release of the finder 115; whereupon ground potential is removed from the control conductor C108 of the private subscriber line 105. At this time battery potential in the line circuit 110 individual to the private subscriber line 105 is returned upon the control conductor thereof, thereby marking the private subscriber line 105 as idle to the connectors 200, etc., having access thereto. Also upon restoring the switch relay R140 completes, at the contacts 148, a circuit, including the contacts 152 and 174 and the set of switch springs S246, for operating the release magnet M218; whereby the wiper carriage of the Strowger mechanism 340 is released and returned to its normal rotary and vertical positions. When the wiper carriage of the Strowger mechanism 340 is thus released, the sets of switch springs S168, S246, S315 and S316 are operated. More particularly, the set of switch springs S168 is operated to open the path for short-circuiting the upper winding of the transfer relay R160; and the set of switch springs S246 is operated to open the circuit for operating the release magnet M218. The set of switch springs S315 is operated in order to open a further point in the circuit for operating the rotary step relay R250; and the set of switch springs S316 is operated in order to open a further point in the circuit for operating the switch relay R140. Further the switch relay R140 recompletes, at the contacts 143 and 146, the normal connections from battery and ground potential via the upper and lower windings of the line relay R150 to the line conductors C116 and C117 extending to the finder 115. Moreover, when the finder 115 is thus released, it is marked as idle to the distributor 112 for reassignment thereby. At this time the connector 200 is released and the trunk of circuit 125 operates in order to return battery potential to the control conductor of the trunk line 126; whereby the trunk line 126 is marked as idle to the connectors 200, etc., having access thereto. Furthermore, the trunk circuit 125 controls the trunk circuit 127 in the exchange 20 over the trunk line 126; whereby the trunk circuit 127 and consequently the automatic switch train 128 in the exchange 20 are released. When the automatic switch train 128 is thus released, the line circuit 130 individually associated with the private subscriber line 129 operates in order again to apply battery potential to the control conductor of the private subscriber line 129, assuming that the subscriber at the private subscriber substation T131 has disconnected at this time; whereby the private subscriber line 129 is again marked as idle to the automatic switch train 128. At this time the established connection between the calling private subscriber substation T101 in the exchange 10 and the called private subscriber substation T131 in the exchange 20 is released and all of the apparatus involved therein is completely released and available for further use.

Now assuming that a call is to be extended from the private subscriber substation T101 to the P. B. X 350 in the exchange 10, the call is first initiated at the calling private subscriber substation T101; whereby the distributor 112 may assign the link illustrated for use; whereby the finder 115 finds the private subscriber line 105 extending to the calling private subscriber substation T101 and the line relay R150 in the connector 200 is operated; all in the manner previously explained. Upon operating the line relay R150 effects operation of the transfer relay R160 and the hold relay R170; the transfer relay R160 bringing about the return of dial tone over the loop circuit to the calling private subscriber substation T101 in the manner previously explained. At this time the subscriber at the calling private subscriber substation T101 dials the directory number of the P. B. X 350, which number may be 911.

When the first digit 9 is dialed, the line relay R150 follows retaining operated the transfer relay R160 and the hold relay R170 and effecting operation of the vertical magnet M166 in the manner previously explained. At the conclusion of the first digit 9, the wiper carriage of the Strowger mechanism 340 occupies its ninth vertical level; whereby the wipers 341, 342, 343 and 344 stand opposite the ninth level in the associated contact bank in which the P. B. X trunks 351, 352 and 353 are terminated. When the wiper carriage of the Strowger mechanism 340 is driven one step in the vertical direction away from its normal vertical position, the sets of switch springs S168 and S246 are operated as previously explained. Also when the wiper carriage of the Strowger mechanism 340 is driven nine steps in the vertical direction away from its normal vertical position, the sets of switch springs S315 and S248 are operated. More particularly, the set of switch springs S315 is operated into engagement in order to prepare the previously traced circuit for operating the rotary step relay R250; and the set of switch springs S248 is operated into disengagement in order to interrupt a further point in a circuit traced hereinafter for operating the ring reverse relay R240. At the conclusion of the first digit 9, the line relay R150 is retained in its operated position in order to cause the transfer relay R160 to restore shortly thereafter, the latter relay being of the slow-to-release type.

At this time the subscriber at the calling private subscriber substation T101 dials the second digit 1; whereby the line relay R150 follows repeating, at the contacts 152, in order to effect operation of the series relay R310 and the series slave relay R320 and the rotary magnet M216. More particularly, the rotary magnet M216 operates and then restores in order to drive the wiper carriage of the Strowger mechanism 340 one step in the rotary direction away from its normal rotary position; whereby the wipers 341, 342, 343 and 344 engage the contact set in the associated contact bank terminating the first P. B. X trunk 351. At the conclusion of the second digit 1, the line relay R150 is retained in its operated position in order to cause the series relay R310 to restore shortly thereafter. At this time the test relay R260 tests the idle or busy condition of the first P. B. X trunk 351. Specifically, assuming that the first P. B. X trunk 351 is busy at this time, ground potential in the associated line circuit 354 appears upon the control conductor thereof and consequently upon the connected extra control conductor thereof. The application of ground potential upon the control conductor of the first P. B. X trunk 351 completes the previously traced circuit, including the control wiper 343 for operating the test relay R260; and upon operating the test relay R260 completes, at the contacts 262, the previously traced circuit, including the set of switch springs S315 and the extra control wiper 344, for operating the rotary step relay R250. Upon operating the rotary step relay R250 completes, at the contacts 252, the previously traced multiple alternative holding circuit for retaining operated the series slave relay R320 and the multiple circuit for operating the rotary magnet M216. Upon operating the rotary magnet M216 interrupts, at the contacts 217, the circuit for retaining operated the rotary step relay R250; whereby the latter relay interrupts, at the contacts 252, the alternative holding circuit for energizing the winding of the series slave relay R320 and the multiple circuit for operating the rotary magnet M216. Accordingly, the rotary magnet M216 operates and then restores in order to drive the wipers 341, 342, 343 and 344 into engagement with the contact set in the associated contact bank terminating the second P. B. X trunk 352; whereby the idle or busy condition of the second P. B. X trunk 352 is tested by the test relay R260. Of course, the second P. B. X trunk 352 is selected in the event it is idle and on the other hand, in the event it is busy, the rotary magnet M216 is reoperated, in the manner previously explained, to drive the wiper carriage of the Strowger mechanism 340 an additional step in the rotary direction; whereby the wipers 341, 342, 343 and 344 select the contact set in the associated contact bank terminating the third P. B. X trunk 353. Assuming that the second P. B. X trunk 352 is also busy, the rotary magnet M216 is reoperated as explained above, whereby the third P. B. X trunk 353 is selected and tested.

First assuming that the third P. B. X trunk 353 is busy at this time, ground potential appearing upon the control conductor thereof completes the previously traced circuit for operating the test relay R260; however since the control conductor of the third P. B. X trunk 353 is not strapped to the extra control conductor thereof, the previously traced circuit for operating the rotary step relay R250 is not recompleted. Accordingly, the rotary magnet M216 is not reoperated; and shortly thereafter, the series slave relay R320 restores, completing, at the contacts 324, the previously traced holding circuit for retaining operated the test relay R260; and completing at the contacts 321, the previously traced path for returning busy tone current over the loop circuit to the calling private subscriber substation T101 in order to indicate to the subscriber thereat that the desired connection may not be had at this time by virtue of the busy condition noted. The subscriber at the calling private subscriber substation T101 then disconnects in order to effect the release of the apparatus in a manner substantially identical to that previously explained.

Now assuming that the third P. B. X trunk 353 is idle when it is selected by the wipers 341, 342, 343 and 344 of the Strowger mechanism 340, battery potential appearing upon the control conductor thereof completes the previously mentioned path for short-circuiting the winding of the test relay R260 in order to prevent operation of the latter relay. Shortly thereafter, the series slave relay R320, being of the slow-to-release type, restores to complete, at the contacts 322, the previously traced circuit for energizing the upper winding of the switch-through relay R330; whereby the latter relay operates shortly thereafter to complete, at the contacts 334, the previously traced holding circuit for energizing the lower winding thereof, the switch-through relay being of the slow-to-operate type. Also the switch-through relay R330 completes, at the contacts 335, the previously traced path, including the contacts 172, for applying ground potential to the control wiper 343 and consequently to the control conductor of the third P. B. X trunk 353 extending to the associated line circuit 356 in order to mark the third P. B. X trunk 353 as busy to the other connectors having access thereto. Also the switch-through relay R330 interrupts, at the contacts 330, a further point in the previously traced circuit for operating the rotary magnet M216 in order positively to prevent further operation of the Strowger mechanism 340 in the rotary direction at this time; and prepares, at the contacts 339, a circuit traced hereinafter for operating the rotary magnet M273 of the code switch 270.

When the subscriber at the calling private subscriber substation T101 dials the third digit 1, the line relay R150 follows. More particularly, the line relay R150 restores and then reoperates completing and then interrupting, at the contacts 152, a circuit, including the contacts 148, 173, 165, 266, and 314, for energizing the winding of the series relay R310 in series with the winding of the series slave relay R320 in order to cause the relays mentioned to reoperate. Also the line relay R150 completes and then interrupts, at the contacts 152, a multiple circuit, including the contacts 148, 173, 165, 266 and 339, for energizing the winding of the series relay R310 in series with the rotary magnet M273; whereby the rotary magnet M273 is operated in order to drive the wipers 271 and 272 of the code switch 270 one step in the counterclockwise direction away from their normal rotary positions. When the wipers noted of the code switch 270 are thus driven one step in the counterclockwise direction away from their normal rotary positions, the set of switch springs S275 is operated for a purpose more fully explained hereinafter. When the wiper 271 of the code switch 270 is driven to engage the first contact in the associated contact bank, the first ringing code conductor extending to the associated ringing code interrupter, not shown, is selected for a purpose more fully explained hereinafter.

At the conclusion of the third digit 1, the line relay R150 is retained in its operated position, and shortly thereafter, the series relay R310, being of the slow-to-release type restores; whereby the series slave relay R320 being of the slow-to-release type, restores after an additional short time interval. Upon restoring the series slave relay R320 completes, at the contacts 325, a direct circuit, including the set of switch springs S275, for operating the test relay R260. Upon operating the test relay R260 completes, at the contacts 265, a connection, including the contacts 338 and 224, between the pick-up conductor C317 extending to the associated ringing code interrupter, not shown, and battery potential via the winding of the pick-up relay R220. At the beginning of a ringing cycle of the ringing code interrupter, not shown, ground potential is applied to the pick-up conductor C317; whereby the winding of the pick-up relay R220 is energized causing the latter relay to operate. Upon operating the pick-up relay R220 completes, at the contacts 223, a holding circuit, including the contacts 172, for energizing the winding thereof; and completes, at the contacts 221 and 222, a path for projecting ringing current from the first ringing code conductor over the selected third P. B. X trunk 353. More particularly, ground potential is connected via the contacts 172, the contacts 243, 233, 222 and 144 and the line wiper 342 to the positive line conductor of the third P. B. X trunk 353; and the first ringing code conductor is connected via the wiper 271 of the code switch 270 and the engaged first contact in the associated contact bank and the upper winding of the ring cut-off relay R230, the contacts 241, 231, 221 and 141 and the line wiper 341 to the negative line conductor of the third P. B. X trunk 353. Accordingly, ringing current from the selected first ringing code conductor is projected over the line conductors of the selected third P. B. X trunk 353 in order to operate the signal drop or ringer at the P. B. X 350 in a conventional manner indicating to the attendant thereat that a call is waiting to be answered on the third P. B. X trunk 353. Also a portion of this ringing current is returned as ring-back tone current to the calling private subscriber substation T101 indicating to the subscriber thereat that the called P. B. X 350 is being rung at this time. More particularly, the negative line wiper 341 included in the ringing circuit above traced is connected via the contacts 141, the condensers 227 and 225 and the contacts 143 to the line conductor C116; and the positive line wiper 342 included in the ringing circuit above traced is connected via the contacts 144, and the condensers 228 and 226 to the line conductor C117; and the line conductors C116 and C117 being included in the previously traced loop circuit extending back to the calling private subscriber substation T101.

When the attendant at the P. B. X 350 answers the call by connecting to the line conductors of the third P. B. X trunk 353, a low resistance circuit identical to that previously traced is completed for energizing the upper winding of the ring cut-off relay R230 in order to cause the latter relay to operate shortly thereafter, it being of the combination slow-to-operate and slow-to-release type. Upon operating the ring cut-off relay R230 completes, at the contacts 236, a holing circuit, including the contacts 172, for energizing the lower winding thereof; interrupts, at the contacts 231 and 233, the path for projecting ringing current over the line conductors of the selected third P. B. X trunk 353 and the path for returning ring-back tone current to the calling private subscriber substation T101; and completes, at the contacts 232, 234, and 235, a loop circuit between the upper and lower windings of the back-bridge relay R210 and the called P. B. X 350. More particularly, ground potential is connected by way of the contacts 235, the lower winding of the back-bridge relay R210, the contacts 234, 222, and 144, and the line wiper 342 to the positive line conductor of the third P. B. X trunk 353; and battery potential is connected by way of the upper winding of the back-bridge relay R210, the contacts 232, 221 and 141, and the line wiper 341 to the negative line conductor of the third P. B. X 353. Accordingly, the upper and lower windings of the back-bridge relay R210 are energized in series via the above traced circuit; whereby the latter relay operates.

Upon operating the back-bridge relay R210 reverses, at the contacts 211, 212, 213, and 214, the polarity of the loop circuit extending between the calling private subscriber substation T101 and the upper and lower windings of the line relay R150; which reversal of polarity over the loop circuit mentioned may be employed in the line circuit 110 individual to the private subscriber line 105 extending to the calling private subscriber substation T101 for metering or other control purposes in a conventional manner. Also at this time, the loop circuit extending between the calling private subscriber substation T101 and the upper and lower windings of the line relay R150 and the loop circuit extending between the called P. B. X 350 and the upper and lower windings of the back-bridge relay R210 are operatively interconnected by the condensers 225 and 226; whereby an established connection is completed between the calling private subscriber substation T101 and the called P. B. X 350. Further, upon operating the back-bridge relay R210 completes, at the contacts 215, a multiple path for applying ground potential to the control conductor C118 in order to retain the finder 115 in its operated position.

At the conclusion of the established connection, when the attendant at the P. B. X 350 or a subscriber at a substation therein disconnects, the loop circuit extending therefrom to the back-bridge relay R210 is interrupted, causing the latter relay to restore. Upon restoring the back-bridge relay R210 again restores, at the contacts 211, 212, 213 and 214, the polarity of the loop circuit extending between the calling private subscriber substation T101 and the line relay R150; however, without effect at this time. Also the back-bridge relay R210 interrupts, at the contacts 215, the multiple path for applying ground potential to the control conductor C118; however, without effect at this time.

When the subscriber at the calling private subscriber substation T101 disconnects, the loop circuit extending to the line relay R150 is interrupted, causing the latter relay to restore. Upon restoring the line relay R150 interrupts, at the contacts 151, the circuit for energizing the winding of the hold relay R170; whereby the latter relay restores shortly thereafter, it being of the slow-to-release type. Upon restoring the hold relay R170 interrupts, at the contacts 171, the path for applying ground potential to the control conductor C118; whereby the finder 115 is released, bringing about the release of the line circuit 110 in order to cause the private subscriber line 105 again to be marked as idle to the connectors 200, etc., having access thereto. Also the hold relay R170 completes, at the contacts 174, the previously traced circuit for operating the release magnet M218; whereby the wiper carriage of the Strowger mechanism 340 is released and returned to its normal rotary and vertical positions. Also the hold relay R170 completes, at the contacts 174, a multiple circuit, including the contacts 148, 152, and 267, for operating the release magnet M274 of the code switch 270; whereby the wipers 271 and 272 thereof are released and returned to their normal rotary positions. Further upon restoring the hold relay R170 interrupts, at the contacts 172, the holding circuits for energizing in multiple the winding of the pick-up relay R220, the lower winding of the ring cut-off relay R230 and the lower winding of the switch-through relay R330; whereby the pick-up relay R220 and the switch-through relay R330 restore immediately and the ring cut-off relay R230 restores shortly thereafter, it being of the combination slow-to-operate and slow-to-release type.

When the Strowger mechanism 340 is thus released, the sets of switch springs S168, S246, S315 and S248 are operated. More particularly, the set of switch springs S168 is operated to interrupt the path for short-circuiting the upper winding of the transfer relay R160; and the set of switch springs S246 is operated to interrupt the circuit for operating the release magnet M218. The set of switch springs S315 is operated to interrupt a further point in the circuit for operating the rotary step relay R250; and the set of switch springs S248 is operated in order again to prepare a circuit traced hereinafter for operating the ring reverse relay R240. When the code switch 270 is thus released, the set of switch springs S275 is operated to interrupt the circuit for retaining operated the test relay R260. Upon restoring the test relay R260 interrupts, at the contacts 267, the circuit for operating the release magnet M274. When the connector 200 is thus released, the line circuit 356 operates in order again to return battery potential upon the control conductor of the third P. B. X trunk 353, thereby to mark the third P. B. X trunk 353 as idle to the connectors 200, etc., having access thereto. At this time the established connection between the calling private subscriber substation T101 and the P. B. X 350 is released and all of the apparatus involved therein is completely released and available for further use.

Now assuming that a call is to be extended from the calling private subscriber substation T101 to the party subscriber substation 361A connected to the party subscriber line 361 in the exchange 10, the call is first initiated at the calling private subscriber substation T101; whereby the distributor 112 may assign the link illustrated for use; whereby the finder 115 finds the private subscriber line 105 extending to the calling private subscriber substation T101; and the line relay R150 in the connector 200 is operated; all in the manner previously explained. Upon operating the line relay R150 effects operation of the transfer relay R160 and the hold relay R170; the transfer relay R160 bringing about the return of dial tone over the loop circuit to the calling private subscriber substation T101 in the manner previously explained. At this time the subscriber at the calling private subscriber substation T101 dials the directory number of the called party subscriber substation 361A, which number may be 611.

When the first digit 6 is dialed the line relay R150 follows retaining operated the transfer relay R160 and the hold relay R170 and effecting operation of the vertical magnet M166 in the manner previously explained. At the conclusion of the first digit 6, the wiper carriage of the Strowger mechanism 340 occupies its sixth vertical level; whereby the wipers 341, 342, 343 and 344 stand opposite the sixth level in the associated contact bank in which the party subscriber line 361 is terminated. When the wiper carriage of the Strowger mechanism 340 is driven one step in the vertical direction away from its normal vertical position, the sets of switch springs S168 and S246 are operated as previously explained. At the conclusion of the first digit 6, the line relay R150 is retained in its operated position in order to cause the transfer relay R160 to restore shortly thereafter, the latter relay being of the slow-to-release type.

At this time, the subscriber at the calling private subscriber substation T101 dials the second digit 1; whereby the line relay R150 follows repeating at the contacts 152 in order to effect operation of the series relay R310 and the series slave relay R320 and the rotary magnet M216. More particularly, the rotary magnet M216 operates and then restores in order to drive the wiper carriage of the Strowger mechanism 340 one step in the rotary direction away from its normal rotary position; whereby the wipers 341, 342, 343 and 344 engage the contact set in the associated contact bank terminating the party subscriber line 361 to which the party subscriber substations 361A, etc., are connected. At the conclusion of the second digit 1, the line relay R150 is retained in its operated position in order to cause the series relay R310 to restore shortly thereafter. At this time the test relay R260 tests the idle or busy condition of the party subscriber line 361. First assuming that the party subscriber line 361 is busy at this time ground potential is applied to the control conductor thereof in the associated line circuit 362, thereby to complete the previously traced circuit including the control wiper 343 for operating the test relay R260. Upon operating the test relay R260 prepares, at the contacts 264, the holding circuit for energizing the winding thereof. Shortly following the restoration of the series relay R310, the series slave relay R320 restores as it is of the slow-to-release type. Upon restoring the series slave relay R320 completes, at the contacts 324, the previously traced holding circuit for energizing the winding of the test relay R260; and interrupts, at the contacts 323, the previously traced original operating circuit for the test relay R260. Further the series slave relay R320 completes, at the contacts 321, the previously traced path for returning busy tone over the loop circuit extending to the calling private subscriber substation T101 in order to indicate to the subscriber thereat that the desired connection may not be had at this time due to the busy condition mentioned. The subscriber at the calling private subscriber substation T101 then disconnects in order to bring about the release of the apparatus in a manner substantially identical to that previously explained.

Now assuming that the party subscriber line 361 is idle when it is selected by the wipers 341, 342, 343, and 344, battery potential in the associated line circuit 362 appears upon the control conductor thereof, thereby to complete a path identical to that previously traced for short-circuiting the winding of the test relay R260 preventing operation of the latter relay at this time. Subsequently, when the series slave relay R320 restores, it interrupts, at the contacts 323, the path for short-circuiting the winding of the test relay R260; and completes, at the contacts 322, the previously traced circuit, including the control wiper 343, for energizing the upper winding of the switch-through relay R330; whereby the latter relay operates shortly thereafter, it being of the slow-to-operate type. Upon operating the switch-through relay R330 completes, at the contacts 334, the previously traced holding circuit for energizing the lower winding thereof; completes, at the contacts 335, the previously traced path for applying direct ground potential to the control wiper 343 in order to mark the party subscriber line 361 as busy to the other connectors having access thereto; and prepares, at the contacts 339, the circuit for operating the rotary magnet M273 of the code switch 270.

When the subscriber at the calling private subscriber substation T101 dials the third digit 1, the line relay R150 follows repeating, at the contacts 152, in order to effect operation of the series relay R310 and the series slave relay R320 and the rotary magnet M273 of the code switch 270. More particularly, the rotary magnet M273 is operated and restored; whereby the wipers noted of the code switch 270 are driven one step in the counterclockwise direction away from their normal rotary positions; and the set of switch springs S275 is operated. When the wiper 271 of the code switch 270 is driven to engage the first contact in the associated contact bank the first ringing code conductor extending to the associated ringing code interrupter, not shown, is selected.

At the conclusion of the third digit 1, the line relay R150 is retained in its operated position and shortly thereafter, the series relay R310, being of the slow-to-release type, restores; whereby the series slave relay R320, being of the slow-to-release type, restores after an additional short time interval effecting operation of the test relay R260 in the manner previously explained. Upon operating the test relay R260 prepares, at the contacts 265, the circuit to the winding of the pick-up relay R220; whereby the pick-up relay R220 is operated via the pick-up conductor C317 at the beginning of the next ringing cycle of the ringing code interrupter, not shown. Upon operating the pick-up relay R220 completes, at the contacts 223, the previously traced holding circuit for energizing the winding thereof; and completes, at the contacts 221 and 222, the previously traced path for projecting ringing current from the first ringing code conductor over the party subscriber line 361; and for returning ring-back tone current over the loop circuit extending to the calling private subscriber substation T101 for the purpose previously mentioned. The ringing current from the first ringing code conductor may be either of a corresponding harmonic frequency or of a corresponding series of coded splashes of short and long durations. In any case, the ringing current projected over the party subscriber line 361 is peculiar to the ringer at the called party subscriber substation 361A. In the event harmonic frequency ringing is employed, only the ringer at the called party subscriber substation 361A is operated; and in the event coded splash ringing is employed the ringers at each party subscriber substation 361A, 361B, etc., is operated, but only the ringer at the called party subscriber substation 361A is operated in accordance with the assigned code.

In any case the subscriber at the called party subscriber substation 361A is signalled; and when the subscriber thereat answers the call, the previously traced circuit for energizing the upper winding of the ring cut-off relay R230 is completed, causing the latter relay to operate shortly thereafter, it being of the combination slow-to-operate and slow-to-release type. Upon operating the ring cut-off relay R230 completes, at the contacts 236, the previously traced holding circuit for energizing the lower winding thereof; interrupts, at the contacts 231 and 233, the path for projecting ringing current over the party subscriber line 361 and the path for returning ring-back tone current to the calling private subscriber substation T101; and completes, at the contacts 232, 234, and 235, the previously traced loop circuit from the called party subscriber substation 361A to the upper and lower windings of the back-bridge relay R210 causing the latter relay to operate. Upon operating the back-bridge relay R210 reverses, at the contacts 211, 212, 213 and 214, the polarity of the loop circuit extending back to the calling private subscriber substation T101. At this time an established connection is completed between the calling private subscriber substation T101 and the called party subscriber substation 361A. The release of this established connection is brought about when the subscriber at the called party subscriber substation 361A and the subscriber at the calling private subscriber substation T101 both disconnect; all in the manner previously explained.

In view of the foregoing it will be understood that the subscriber at the calling private subscriber substation T101 may extend a call to any one of the other party subscriber substations 361B, 361C, etc., in a substantially identical manner by dialing the corresponding directly numbers 612, 613, etc. When these directory numbers are thus dialed, the first two digits 6 and 1 bring about selection by the wiper carriage of the Strowger mechanism 340 of the party subscriber line 361; whereas the third digits 2, 3, etc., bring about corresponding settings of the code switch 270 in order to cause selection of the corresponding second, third, etc., ringing code conductors extending to the ringing code interrupter, not shown. The ringing codes on the corresponding second, third, etc., ringing conductors, in turn, bring about corresponding operation of the ringers at the respective called party subscriber substations 361B, 361C, etc., in a manner similar to that described above.

Now assuming that a call is to be extended from the calling private subscriber substation T101 to one of the called party subscriber substations 381A, 381B, etc., connected to the party subscriber line 381 in the exchange 10, the subscriber at the calling private subscriber substation T101 first initiates the call and then dials the directory number of the called party subscriber substation 381A, 381B, etc.; which numbers are respectively 811, 812, etc. Again assuming that the link illustrated is assigned by the distributor 112 for use at this time, the connector 200 responds to the number 811, 812, etc., in the manner previously explained. More particularly, the first two digits 8 and 1 bring about operation of the wiper carriage of the Strowger mechanism 340 to select the party subscriber line 381 to which the party subscriber substations 381A, 381B, etc., are connected. The third digit 1, 2, etc., is registered in the code switch 270 in order to cause selection of the corresponding first, second, etc., ringing code conductor extending to the ringing code interrupter, not shown. The ringing code on the corresponding first, second, etc., ringing conductor, in turn, brings about corresponding operation of the ringer at the corresponding called party subscriber substation 381A, 381B, etc., in a manner similar to that described above. In this connection, it is pointed out that the ringing current that is projected over the negative line wiper 341 and the negative line conductor of the party subscriber line 381 includes the section of earth between ground potential in the exchange 10 and ground potential at the called party subscriber substation 381A, 381B, etc., since the negative line conductor of the party subscriber line 381 is connected through the ringer at the called one of the party subscriber substations 381, 381B, etc., directly to ground potential thereat. Similarly, when an established connection is ultimately completed to the called party subscriber substation 381A, 381B, etc., the loop circuit extending therefrom back to the upper winding of the back-bridge relay R210 in the connector 200 includes the section of earth between ground potential in the exchange 10 and the ground connection to the subscriber substation apparatus at the called party subscriber substations 381A, 381B, etc. The subsequent release of this established connection and the apparatus involved therein is identical to that previously described.

Now assuming that a call is to be extended from the calling private subscriber substation T101 to one of the called subscriber substations 371A, 371B, etc., connected to the party subscriber line 371 in the exchange 10, the subscriber at the calling private subscriber substation T101 first initiates the call and then dials the directory number of the called party subscriber substation 371A, 371B, etc., which numbers are respectively 711, 712, etc. Again assuming that the link illustrated is assigned by the distributor 112 for use at this time, the connector 200 responds to the numbers 711, 712, etc., in the manner previously explained. More particularly, the first two digits 7 and 1 bring about operation of the wiper carriage of the Strowger mechanism 340 to select the party subscriber line 371 to which the party subscriber substations 371A, 371B, etc., are connected. The third digit 1, 2, etc., is registered in the code switch 270 in order to cause selection of the corresponding first, second, etc., ringing code conductor extending to the ringing code interrupter, not shown.

In the event the present call is to be extended to one of the first five party subscriber substations 371A, 371B, 371C, 371D and 371E connected to the party subscriber line 371, the corresponding third digit 1, 2, 3, 4 or 5 is registered in the code switch 270, and ringing over the negative line wiper 341 in the connector 200 takes place in precisely the same manner as that previously explained; whereby the ringer at the called private subscriber substation 371A, 371B, etc., connected between the negative line conductor of the party subscriber line 371 and ground potential thereat, is operated directly over the negative line conductor of the party subscriber line 371. For example, this ringing circuit may extend from one terminal of the ringing code interrupter, not shown, via the first ringing code conductor, the wiper 271 of the code switch 270, and the engaged first contact in the associated contact bank, the upper winding of the ring cut-off relay R230, the contacts 241, 231, 221, and 141, the negative line wiper 341, the negative line conductor of the party subscriber line 371, and the ringer at the party subscriber substation 371A to ground potential; thence via the section of earth between ground potential at the called party subscriber substation 371A to ground potential in the exchange 10 to which the other terminal of the ringing code interrupter, not shown, is connected. Subsequently, when the subscriber at the called party subscriber substation 371A answers the call, the previously traced circuit including the upper winding of the ring cut-off relay R230 is completed; whereby the latter relay operates in order to arrest the projection of ringing current over the party subscriber line 371 and the return of ring-back tone current to the calling private subscriber substation T101 and to complete the loop circuit between the called party subscriber substation 371A and the upper end lower windings of the backbridge relay R210; all in the manner previously explained.

On the other hand in the event the present call is to be extended to one of the second five party subscriber substations 371F, 371G, 371H, 371I and 371J connected to the party subscriber line 371, the corresponding third digit 6, 7, 8, 9, or 0 is registered in the code switch 270. Accordingly in this special event when the switch-through relay R330 operates, the party subscriber line 371 having previously been tested as idle by the test relay R260, it also completes, at the contacts 333, a circuit for operating the ring reverse relay R240. This circuit extends from the grounded control conductor of the party subscriber line 371 via the strap to the extra control conductor thereof and thence via the extra control wiper 344, the contacts 333 and the set of switch springs S248 to the wiper 272 of the code switch 270. At this time the wiper 272 of the code switch engages one of the sixth to the tenth contacts in the associated contact bank completing the circuit through the winding of the ring reverse relay R240 to battery potential. Upon operating the ring reverse relay R240 reverses, at the contacts 241, 242, 243 and 244, the connections between the wiper 271 of the code switch 270 and ground potential at the contacts 172 and the line wipers 341 and 342. More specifically, at this time the wiper 271 of the code switch 270 is connected via the upper winding of the ring cut-off relay R230, the contacts 242, 233, 222, and 144, to the positive line wiper 342; and ground potential at the contacts 172 is connected via the contacts 244, 231, 221 and 141 to the negative line wiper 341. Accordingly, ringing current is projected over the positive line conductor of the party subscriber line 371; whereby the ringer at the called party subscriber substation 371F, 371G, etc., connected between the positive line conductor of the party subscriber line 371 and ground potential thereat is operated directly over the positive line conductor of the party subscriber line 371. For example, the ringing circuit may extend from one terminal of the ringing code interrupter, not shown, via the sixth ringing code conductor, the wiper 271 of the code switch 270 and the engaged sixth contact in the associated contact bank, the upper winding of the ring cut-off relay R230, the contacts 242, 233, 222 and 141, the positive line wiper 342, the positive line conductor of the party subscriber line 371 and the ringer at the party subscriber substation 371F to ground potential; thence via the section of earth between ground potential at the called party subscriber substation 371F to ground potential in the exchange 10 to which the other terminal of the ringing code interrupter, not shown, is connected. Subsequently, when the subscriber at the called party subscriber substation 371F answers the call, a circuit substantially identical to that previously traced and including the upper winding of the ring cut-off relay R230 is completed; whereby the latter relay operates in order to arrest the projection of ringing current over the party subscriber line 371 and the return of ring-back tone current to the calling private subscriber substation T101 and to complete the loop circuit between the called party subscriber substation 371F and the upper and lower windings of the backbridge relay R210; all in the manner previously explained. The subsequent release of this established connection and the apparatus involved therein is identical to that previously described.

Now assuming that a call is to be extended from the calling private subscriber substation T101 to one of the first ten called party subscriber substations 391A to 391J, inclusive, connected to the party subscriber line 391 in the exchange 10, the subscriber at the calling private subscriber substation T101 first initiates the call and then dials the directory number of the called party subscriber substation 391A to 391J, inclusive, which numbers are respectively 511 to 510, inclusive. Again assuming that the link illustrated is assigned by the distributor 112 for use at this time, the connector 200 responds to the numbers 511 to 510, inclusive, in the manner previously explained. More particularly, the first two digits 5 and 1 bring about operation of the wiper carriage of the Strowger mechanism 340 to select the party subscriber line 391 to which the party subscriber substations 391A to 391J, inclusive, and 391AA to 391JJ, inclusive, are connected. When the wiper carriage of the Strowger mechanism 340 is operated to its fifth vertical level, the set of switch springs S247 is operated in order to prepare an alternative circuit traced hereinafter for operating the ring reverse relay R240. The third digit 1 to 0, inclusive, is registered in the code switch 270 in order to cause selection of the corresponding first to tenth, inclusive, ringing code conductor extending to the ringing code interrupter, not shown. Ringing takes place over the negative line wiper 341 and the negative line conductor of the party subscriber line 391 in precisely the same manner as that previously explained; the ringing code on the corresponding first to tenth, inclusive, ringing conductor in turn brings about corresponding operation of the ringer at the corresponding called party subscriber substations 391A to 391J, inclusive, in the manner previously explained. When the subscriber at the called party subscriber substation 391A to 391J, inclusive, answers the call, the ring cut-off relay R230 is operated in order to arrest the projection of ringing current over the party subscriber line 391, to arrest the return of ring-back tone current to the calling private subscriber substation T101 and to complete the loop circuit between the called party subscriber substation 391A to 391J, inclusive, and the upper and lower windings of the back-bridge relay R210; whereby an established connection is completed between the calling private subscriber substation T101 and the called party subscriber substation 391A to 391J, inclusive. The subsequent release of this established connection and the apparatus involved therein is identical to that previously described.

Now assuming that a call is to be extended from the calling private subscriber substation T101 to one of the second ten called party subscriber substations 391AA to 391JJ, inclusive, connected to the party subscriber line 391 in the exchange 10, the subscriber at the calling private subscriber substation T101 first initiates the call and then dials the directory number of the called party subscriber substation 391AA to 391JJ, inclusive, which numbers are respectively 521 to 520, inclusive. Again assuming that the link illustrated is assigned by the distributor 112 for use at this time, the connector 200 responds to the numbers 521 to 520, inclusive, in the manner previously explained. More particularly, the first two digits 5 and 2 bring about operation of the wiper carriage of the Strowger mechanism 340 again to select the party subscriber line 391 to which the party subscriber substations 391A to 391J, inclusive, and 391AA to 391JJ, inclusive, are connected; and the set of switch springs S247 is operated. The third digit 1 to 0, inclusive, is registered in the code switch 270 in order to cause the selection of the corresponding first to tenth, inclusive, ringing code conductor extending to the ringing code interrupter, not shown.

In this case when the switch-through relay R330 operates, the party subscriber line 391 having previously been tested as idle by the test relay R260, it also completes, at the contacts 333, a circuit for operating the ring reverse relay R240. This circuit extends from the grounded control conductor of the party subscriber line 391 via the strap to the extra control conductor thereof and thence via the extra control wiper 344, the contacts 333 and the sets of switch springs S248 and S247 and the winding of the reverse battery relay R240 to battery potential. Upon operating the reverse battery relay R240 reverses, at the contacts 241, 242, 243 and 244, the connections between the wiper 271 of the code switch 270 and ground potential at the contacts 172 and the line wipers 341 and 342. More specifically, at this time the wiper 271 of the code switch 270 is connected via the upper winding of the ring cut-off relay R230, the contacts 242, 233, 222 and 144 to the positive line wiper 342; and ground potential at the contacts 172 is connected via the contacts 244, 231, 221 and 141 to the negative line wiper 341. Accordingly, ringing current is projected over the positive line wiper 342 and the positive line conductor of the party subscriber line 391; whereby the ringer at the called party subscriber substation 391AA, 391BB, etc., connected between the positive line conductor of the party subscriber line 391 and ground potential thereat is operated directly over the positive line conductor of the party subscriber line 391. For example, the ringing circuit may extend from one terminal of the ringing code interrupter, not shown, via the sixth ringing code conductor, the wiper 271 of the code switch 270 and the engaged sixth contact in the associated contact bank, the upper winding of the ring cut-off relay R230, the contacts 242, 233, 222 and 144, the positive line wiper 342, the positive line conductor of the party subscriber line 391 and the ringer in the party subscriber substation 391FF to ground potential; thence via the section of earth between ground potential at the called party subscriber substation 391FF to ground potential in the exchange 10 to which the other terminal of the ringing code interrupter, not shown, is connected. Subsequently, when the subscriber at the called party subscriber substation 391FF answers the call, a circuit substantially identical to that previously traced and including the upper winding of the ring cut-off relay R230 is completed; whereby the latter relay operates in order to arrest the projection of ringing current over the party subscriber line 391 and the return of ring-back tone current to the calling private subscriber substation T101, and to complete the loop circuit between the called party subscriber substation 391FF and the upper and lower windings of the back-bridge relay R210; whereby an established connection is completed between the calling private subscriber substation T101 and the called party subscriber substation 391FF. The subsequent release of this established connection and the apparatus involved therein is identical to that previously described.

In view of the foregoing it is apparent that there has been provided in an automatic telephone system, including a group of trunks and a plurality of party subscriber lines, a connector switch incorporating combination trunk-hunting and ringing control facility.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In a telephone system including a party subscriber line provided with first and second line conductors; an automatic switch provided with a contact bank including first and second contact sets commonly terminating said party subscriber line, means for selectively operating said switch to select said party subscriber line via said first contact set or via said second contact set, a ring reverse relay normally selecting said first line conductor, said ring reverse relay being responsive to operation of said switch to select said party subscriber line via said second contact set to select said second line conductor, a ringing conductor, and means for connecting said ringing conductor to the selected one of said line conductors.

2. In a telephone system including a party subscriber line provided with first and second line conductors; an automatic switch provided with a contact bank including first and second contact sets commonly terminating said party subscriber line, means for selectively operating said switch to select said party subscriber line via said first contact set or via said second contact set, a ring reverse relay normally selecting said first line conductor, said ring reverse relay being responsive to operation of said switch to select said party subscriber line via said second contact set to select said second line conductor, a plurality of ringing conductors, means for selecting any one of said ringing conductors, and means for connecting the selected one of said ringing conductors to the selected one of said line conductors.

3. In a telephone system including a party subscriber line provided with first and second line conductors; a numerical switch provided with a contact bank including first and second contact sets commonly terminating said party subscriber line, means responsive to a given directory number for operating said switch to select said party subscriber line via said first contact set and responsive to a different directory number for operating said switch to select said party subscriber line via said second contact set, a ring reverse relay normally selecting said first line conductor, said ring reverse relay being responsive to operation of said switch to select said party subscriber line via said second contact set to select said second line conductor, a ringing conductor, and means for connecting said ringing conductor to the selected one of said line conductors.

4. In a telephone system, an automatic switch comprising a wiper set including first and second line wipers and first and second control wipers, first and second contact sets accessible to said wiper set and each including first and second line contacts and first and second control contacts, a line having first and second line conductors respectively terminated by the first and second line contacts in both said first and second contact sets, a strap connecting together the first control contact in said first contact set and the first and second control contacts in said second contact set, means for selectively operating said wiper set to select said first contact set or said second contact set and for applying a given potential to the first control wiper of said wiper set, a ring reverse relay normally selecting the first line wiper of said wiper set, said ring reverse relay being responsive to the presence of said given potential returned upon the second control wiper of said wiper set to select the second line wiper of said wiper set, a ringing conductor, and means for connecting said ringing conductor to the selected one of the line wipers of said wiper set.

5. In a telephone system, an automatic switch comprising a wiper set including first and second line wipers and first and second control wipers, first and second contact sets accessible to said wiper set and each including first and second line contacts and first and second control contacts, a line having first and second line conductors respectively terminated by the first and second line contacts in both said first and second contact sets, a strap connecting together the first control contact in said first contact set and the first and second control contacts in said second contact set, means for selectively operating said wiper set to select said first contact set or said second contact set and for applying a given potential to the first control wiper of said wiper set, a ring reverse relay connected to the second control wiper of said wiper set and operated in response to the presence of said given potential returned upon the second control wiper of said wiper set, means including contacts controlled by said ring reverse relay for selecting the first line wiper of said wiper set when said ring reverse relay occupies its restored position and for selecting the second line wiper of said wiper set when said ring reverse relay occupies its operated position, a ringing conductor, and means for connecting said ringing conductor to the selected one of the line wipers of said wiper set.

6. In a telephone system, an automatic switch comprising a wiper set including first and second line wipers and first and second control wipers, first and second and third contact sets accessible to said wiper set and each including first and second line contacts and first and second control contacts, a first line having first and second line conductors respectively terminated by the first and second line contacts in said first contact set, a first strap connecting together the first and second control contacts in said first contact set, a second line having first and second line conductors respectively terminated by the first and second line contacts in both said second and third contact sets, a second strap connecting together the first control contact in said second contact set and the first and second control contacts in said third contact set, means for selectively operating said wiper set to select any one of said contact sets and for applying a given potential to the first control wiper of said wiper set, a plurality of ringing codes, mechanism operative to select any one of said ringing codes, means for selectively operating said mechanism, means controlled jointly by operation of said wiper set to select said first contact set and by the presence of said given potential returned upon the second control wiper of said wiper set and by operation of said mechanism for determining the one of the line wipers of said wiper set to which the selected one of said ringing codes is to be connected, and additional means controlled jointly by operation of said wiper set to select said second contact set or said third contact set and by the absence or presence of said given potential returned upon the second control wiper of said wiper set for determining the one of the line wipers of said wiper set to which the selected one of said ringing codes is to be connected.

7. In a telephone system including a group of trunks and a plurality of party subscriber lines; an automatic switch comprising a wiper set having access to said trunks and to said party subscriber lines and provided with a pair of line wipers and first and second control wipers, digit responsive means for selectively operating said wiper set to select the first trunk in said group or any one of said party subscriber lines, a switch-through relay, a test relay, a step relay, a ring control relay, means controlled by operation of said wiper set to make any selection for completing a test circuit for operating said test relay over said first control wiper in the event the selected trunk or party subscriber line is busy, means controlled jointly by operation of said wiper set to select other than the last trunk in said group and by operation of said test relay for operating said step relay, means controlled by operation of said step relay for restoring said test relay and for reoperating said wiper set to select the next adjacent trunk in said group, means controlled by sustained operation of said test relay for returning a busy signal over said switch, means controlled by failure of operation of said test relay for operating said switch-through relay and for preparing a circuit for said ring control relay over said second control wiper, additional means for selectively completing the circuit for said ring control relay in the event it is prepared, a ringing conductor, and means controlled by the position of said ring control relay for selectively determining the one of the line wipers of said wiper set to which said ringing conductor is to be connected.

8. In a telephone system including a group of trunks and a plurality of party subscriber lines; an automatic switch comprising a wiper set having access to said trunks and to said party subscriber lines and provided with a pair of line wipers and first and second control wipers, digit responsive means for selectively operating said wiper set to select the first trunk in said group or any one of said party subscriber lines, a switch-through relay, a test relay, a step relay, a ring control relay, means controlled by operation of said wiper set to make any selection for completing a test circuit for operating said test relay over said first control wiper in the event the selected trunk or party subscriber line is busy, means controlled jointly by operation of said wiper set to select other than the last trunk in said group and by operation of said test relay for operating said step relay, means controlled by operation of said step relay for restoring said test relay and for reoperating said wiper set to select the next adjacent trunk in said group, means controlled by sustained operation of said test relay for returning a busy signal over said switch, means controlled by failure of operation of said test relay for operating said switch-through relay and for preparing a circuit for said ring control relay over said second control wiper, a plurality of ringing codes, mechanism operative to select any one of said ringing codes, means for selectively operating said mechanism, means controlled by operation of said mechanism for selectively completing the circuit for said ring control relay in the event it is prepared, and means controlled by the position of said ring control relay for selectively determining the one of the line wipers of said wiper set to which the selected one of said ringing codes is to be connected.

9. In a telephone system including a group of trunks and a plurality of party subscriber lines; an automatic switch comprising a wiper set having access to said trunks and to said party subscriber lines and provided with a pair of line wipers and first and second control wipers, digit responsive means for selectively operating said wiper set to select the first trunk in said group or any one of said party subscriber lines, a switch-through relay, a test relay, a step relay, a ring control relay, means controlled by operation of said wiper set to make any selection for completing a test circuit for operating said test relay over said first control wiper in the event the selected trunk or party subscriber line is busy, means controlled jointly by operation of said wiper set to select other than the last trunk in said group and by operation of said test relay for operating said step relay, means controlled by operation of said step relay for restoring said test relay and for reoperating said wiper set to select the next adjacent trunk in said group, means controlled by sustained operation of said test relay for returning a busy signal over said switch, means controlled by failure of operation of said test relay for operating said switch-through relay, means controlled by operation of said wiper set to select a particular one of said party subscriber lines for preparing a circuit for said ring control relay over said second control wiper, means controlled by operation of said switch-through relay for completing said circuit for said ring control relay in the event it is prepared, a ringing conductor, and means controlled by the position of said ring control relay for selectively determining the one of the line wipers of said wiper set to which said ringing conductor is to be connected.

CLARENCE E. LOMAX.

REFERENCES CITED

The following references are of record in the file of this patent:

UNITED STATES PATENTS

| Number | Name | Date |
|---|---|---|
| 1,579,837 | Powell | Apr. 6, 1926 |
| 1,688,656 | Ray | Oct. 23, 1928 |
| 1,891,423 | Kahn | Dec. 20, 1932 |
| 1,914,384 | Richardson | June 20, 1933 |
| 2,239,902 | Peterson | Apr. 29, 1941 |
| 2,289,503 | Koechling | July 14, 1942 |
| 2,490,054 | Hatton | Dec. 6, 1949 |

FOREIGN PATENTS

| Number | Country | Date |
|---|---|---|
| 29,359 | Great Britain | Dec. 22, 1913 |